P. C. SCHORR.
OUTLET BOX BUSHING.
APPLICATION FILED SEPT. 27, 1911.

1,041,888.

Patented Oct. 22, 1912.

Witnesses,
George Voelker
Ad. Swanson

Inventor,
Paul C. Schorr
by Lathrop & Johnson
his Attorneys.

UNITED STATES PATENT OFFICE.

PAUL C. SCHORR, OF ST. PAUL, MINNESOTA.

OUTLET-BOX BUSHING.

1,041,888.  Specification of Letters Patent.  Patented Oct. 22, 1912.

Application filed September 27, 1911. Serial No. 651,529.

*To all whom it may concern:*

Be it known that I, PAUL C. SCHORR, a citizen of the United States, residing at St. Paul, in the county of Ramsey and State of Minnesota, have invented certain new and useful Improvements in Outlet-Box Bushings, of which the following is a specification.

My invention relates to improvements in outlet boxes and associated wire conduits employed in electric wiring, its object being particularly to provide improved means for removably closing the box ends of the conduits.

To this end my invention consists in the features of construction, combination, and arrangement of parts hereinafter described and claimed.

Figure 1:
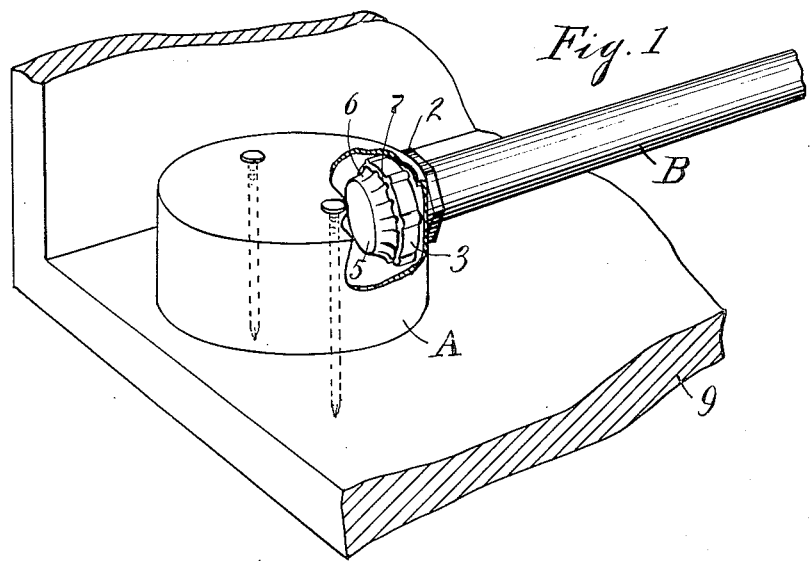
Figure 2:
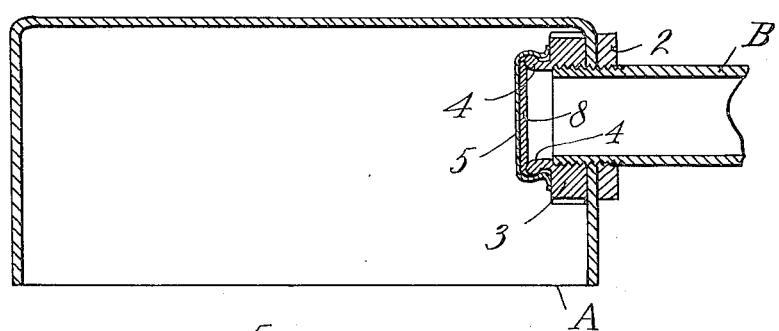
Figure 3:
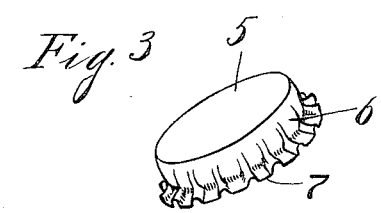

In the accompanying drawings forming part of this specification, Figure 1 is a perspective view of my improvements partly broken away and shown in position in connection with a concrete wall mold; Fig. 2 is a central vertical section through the outlet box and wire conduit; and Fig. 3 is a perspective view of a removable cap forming part of my invention.

Referring to the drawings A represents one form of outlet box, and B the wire conduit shown threaded through an opening in one side of the box. The conduit is secured in the opening in the box by means of a lock nut 2 threaded upon the conduit and bearing against the outer wall of the box and a bushing 3 threaded upon the end of the conduit and bearing against the inner wall of the box. In carrying out my invention I form the bushing with a forwardly and laterally extending circumferential flange 4. 5 represents a cap having an inwardly flanged edge 6 adapted to be clamped inwardly over the flange 4 through the medium of the crimping 7. I preferably employ a filling sheet 8 of cork arranged inside the cap so as to be squeezed between the cap and flange 4.

In use the outlet box is suitably secured in position, as by means of being fastened to the mold 9 so as to allow the concrete to be poured around the box, when the mold can be removed. The conduit being fastened in the opening in the wall of the box by means of the lock nut 2 and bushing 3, and the cap 5 being clamped over the flange 4 concrete and other dirt is prevented from getting into the conduit. The cap forms a substantially unbreakable closure which may be easily removed when it is desired to thread the wires through the conduit.

I claim as my invention:

1. In combination, an outlet box, a conduit extending through one wall thereof, means for securing said conduit in position including a bushing threaded upon the end of the conduit and bearing against the inner face of the box wall, a flange extending inwardly from said bushing, and a covering cap secured over said flange.

2. In combination an outlet box, a conduit extending through one wall thereof, means for securing said conduit in position including a bushing threaded upon the end of the conduit and bearing against the inner face of the box wall, a flange extending inwardly and laterally from said bushing, and a covering cap secured over said flange.

In testimony whereof I affix my signature in presence of two witnesses.

PAUL C. SCHORR.

Witnesses:
H. S. JOHNSON,
H. SWANSON.